United States Patent [19]
Wells et al.

[11] Patent Number: 5,164,717
[45] Date of Patent: Nov. 17, 1992

[54] METHOD AND APPARATUS FOR THE DITHERING OF ANTIALIASED VECTORS

[75] Inventors: Stuart C. Wells, Santa Clara; Grant J. Williamson, Sunnyvale, both of Calif.

[73] Assignee: Sun Microsystems, Inc., Mountain View, Calif.

[21] Appl. No.: 413,977

[22] Filed: Sep. 28, 1989

[51] Int. Cl.$^5$ .............................................. G09G 5/00
[52] U.S. Cl. .................................. 340/793; 358/455; 358/457; 358/458
[58] Field of Search ............... 340/701, 703, 723, 724, 340/767, 793, 739, 728, 747; 358/160, 168, 169, 240, 455, 456, 457, 458, 459; 364/518, 521

[56] References Cited
U.S. PATENT DOCUMENTS

| | | | |
|---|---|---|---|
| 3,959,583 | 5/1976 | Judice et al. | 358/240 |
| 3,961,134 | 6/1976 | Jarvis | 340/767 |
| 4,586,037 | 4/1986 | Rosener et al. | 340/724 |
| 4,821,334 | 4/1989 | Ogino et al. | 358/457 |
| 4,956,638 | 9/1990 | Larky et al. | 340/701 |
| 4,975,786 | 12/1990 | Katayama et al. | 358/457 |

Primary Examiner—Alvin E. Oberley
Assistant Examiner—Richard Hjerpe
Attorney, Agent, or Firm—Blakely Sokoloff Taylor & Zafman

[57] ABSTRACT

In the method and apparatus of the present invention, dithered images are composited with separately rendered undithered images. The dithered image is first transformed back to its unquantized state to include the full range of intensity values by performing a back-transforming process which translates the quantized or dithered value back to its original intensity value. The back transformed dithered image is then combined with the separately rendered, but undithered image using the technique of compositing. The composited image is then dithered to a quantized representation are stored in the frame buffer for subsequent display.

14 Claims, 27 Drawing Sheets

Intersection of conic filters and unit width line.

```
/*Global parameters
*_____*/

REAL    r;                      /*    radius of convolution function    */
REAL    ln_w;                   /*    line width    */
REAL    A(cf_div2 * cf_div2);   /*    array of conv. func. A (cf_div2 * cf_div2)    */
REAL    look_up_table (len);    /*    lookup table with filter weights    */
/*
* The conv. function covers area 2rx2r. We are only interested in one quadrant
*/
INTEGER  cf_div;                /*    num. of subdivision in "2r" distance    */
INTEGER  cf_div2;               /*    num. of subdivision in "r" distance    */
INTEGER  ln_div;                /*    num. of discrete dist. of line_pixel centers.    */

/* (1) Generate array of cone function subdivision elements.*/
/*
* Divide one quadrant of the cone function into cf_div2 * cf_div2 elements.
* For each element, in order to achieve higher accuracym further subdivide into
* 400 smaller "super subdivisions" (a 20 *20 grid). Store the volume values
* calculated for each large subdivision into the array A.
*_____*/

BEGIN/* Phase (1) */

INTEGER   i, j, k, l;
INTEGER   ii, i2, j2;
REAL   cent_x, cent_y;
REAL   sumi;
REAL   x, fk, y, fl;
REAL   h, val;
REAL   spsdq;                   /* super subdivision for greater accuracy */
REAL   sqrt( ), dist;
REAL   pi: = 3.141592654;

cf_div2 : = cf_div/2;
/* super subdivision = 1/20th of a subdivision element */
spsdq : = r/cf_div2 * 0.05;
spsdq * : = spsdq;              /* area of super subdivision element */
/* center of cone */
cent_x := cf_div2;
cent_y := cent_x;

/* height of cone with volume = 1 */
h := 3.0/((r*r)*pi;
```

Figure 5c 1 of 3

```
/* for each subdivision determine area under it */
ii:=0;
FOR i := 0 TO cf_div2-1 DO
BEGIN
   x := i + 0.025 - cent_x;
   FOR j := 0 TO cf_div2-1 DO
   BEGIN
      sumi := 0.0;
      y := j + 0.025 - centy;

fk:=0.0;
      FOR k := 0 TO 19 DO
      BEGIN
         fl:= 0.0;
         FOR l := 0 TO 19 DO
         BEGIN
            dist := square_root (x + fk)*(x + fk) + (y + fk)*(y + fk)  );

IF (dist > cf_div2) THEN
               val := 0.0;      /* if subdiv. is outside of cf circle */
            ELSE
               val := h * (1.0 - dist/cf_div2) * spsdq;
               /* hight at any point is h(1-dist/r) and volume
                * is obtained by multiplying by base area - spsdq */
            sumi := sumi + val;
            fl := fl + 0.05;
         END /* + */
         fl := fl + 0.05;
      END /* -k- */

A(ii+j) := sumi;   /* Add another volume element entry to the array */

END /* -j- */
   ii := ii + cf_div2;
   END /* -i- */
END      /* Phase (1) */
```

Figure 5c

```
/* (2) Create line table for antialiasing.
 *
 * For distances 0 to len-1 from the center of the conical filter function,
 * calculate the volume intersected by a line of width ln_w. Dtore the results
 * in the array look_up_table.
 *                                                                          */
BEGIN   /* Phase (2) */
INTEGER    j, jj, k, kk;
INTEGER    len;              /*  table length R + line_width/2+1  */
REAL hw:+ ln_w/2.0;    /*  half line width  */
INTEGER    i, lb, rb;
REAL flb, frb;
REAL p, pp, sum;

len := ((r+hw)*ln_dv) +1;
pp := 1.0/ln_dv;             /*  delta for line_to_pixel distance  */ p:0.0;
FOR i := 0 TO len-1 DO
BEGIN
  flb :=(r+p-hw)*cf_div2;  /*  left boundary -> cf. division  */
  lb := round (flb);
  frb := (r+p+hw)*cf_div2;  /*  right boundary -> cf. division  */
  rb := round(frb):

IF (lb < 0) THEN    lb := 0;
  IF (rb > (cf_div)) THEN rb :=cf_div;

sum := 0.0;
  FOR k := lb TO rb-1 DO  /*  from left to right boundary  */
  BEGIN
    IF (k < cf_div2) THEN
       kk := k*cf_div2;
    ELSE
       kk := (cf_div-1-k)*cf_div2;
    FOR j := 0 TO cf_div-1 DO  /*  from bottom= 0 to top= cf_div-1  */
    BEGIN
       IF (j < cf_div2) THEN
          jj := j;
       ELSE
          jj := cf_div-1-j;    */  mirrired around cf_div-1  */ sum := sum + A(kk+jj);   /*  add all elements which contribute  */
    END
  END look_up_table(i) := sum;         /*  sum is volume for distance i in table  */
  p : p + pp;
  END /* + */
END    /* Phase (2) */
```

Figure 5c

```
INTEGER x,y;
REAL p,m,c,s;

m := (y2-y1)/(x2-x1);      /* compute gradient of line. */
c := 1/sqrt(m*m+1);        /* c = relation between perpendicular distance
                              and vertical distance. */
p := 0;                    /* p = perpendicular distance from pixel to line
                              center. */
inner_c = m*c;
outer_c = m*c;
s := (0.5-m)*c;            /* threshold distance used to decide whether
                              the next central pixel is on diagonal or horiz. */ y := y1;

FOR x := x1 TO x2 DO
BEGIN
      weight1 = look_up_table(p);        /* look up filter weight at */
      weight2 = look_up_table(p-c);      /* distance p. */
      weight3 = look_up_table(p+c);

color1 = color*weight1;            /* determine color of pixel. */
      color2 = color*weight2;
      color3 = color*weight3;
      paint_pixel(color1,x,y);           /* output color for compositing. */
      paint_pixel(color2,x,y-1);
      paint_pixel(color3,x,y+1)

IF (p>=s) THEN                     /* determine next pixel on line. */
            BEGIN
                  y := y+1;              /* take a diagonal move. */
                  p := p+inner_c;        /* compute perpendicular
                                            distance. */
            END
      ELSE
            p := p+outer_c;              /* take a vertical move. */
END;
```

Figure 5d $$q(i) = \begin{cases} i/9 & \text{for } 0 \leq i \leq 54 \\ ((i-54)/17)+6 & \text{for } 54 < i \leq 156 \\ ((i-156)/33)+12 & \text{for } 156 < i \leq 255 \end{cases}$$

Figure 6a $$\text{Back-Transform}(i) = \begin{cases} q(i) * 9 & \text{for } 0 \leq q(i) < 7 \\ ((q(i)-6)*17)+54 & \text{for } 7 \leq q(i) < 13 \\ ((q(i)-12)*33)+156 & \text{for } 13 \leq q(i) < 16 \end{cases}$$

Figure 6b

If i < 7 then      output = (i << 3) v i else if i < 13      output = ((i - 3) << 4) v i else      output = (((i << 1) - 15) << 4) v i v := Logical OR
<< := Left Shift

Figure 6c

Fixed: 8-bit fg: 34
8-bit bg: 17

Variable: alpha: (0.0,1.0), increment = 0.1

| alpha | Cfloat | CDavg | CDerr | DCavg | DCerr |
|-------|--------|-------|-------|-------|-------|
| 0.0 | 17.0 | 17.0 | 0.0 | 17.0 | 0.0 |
| 0.1 | 18.7 | 19.1 | 2.3 | 17.0 | -9.1 |
| 0.2 | 20.4 | 20.2 | -1.0 | 17.0 | -16.7 |
| 0.3 | 22.1 | 22.3 | 1.0 | 17.0 | -23.1 |
| 0.4 | 23.8 | 24.4 | 2.7 | 17.0 | -28.6 |
| 0.5 | 25.5 | 25.5 | 0.0 | 34.0 | 33.3 |
| 0.6 | 27.2 | 26.6 | -2.3 | 34.0 | 25.0 |
| 0.7 | 28.9 | 28.7 | -0.7 | 34.0 | 17.6 |
| 0.8 | 30.6 | 30.8 | 0.7 | 34.0 | 11.1 |

Fixed:   8-bit fg:   255
         8-bit bg:   238

Variable:   alpha:   (0.0,1.0), increment = 0.1 cat t4.err | tekplot -w .2 -h .2 -x 0 1 .1 -y -4 4 1

| alpha | Cfloat | CDavg | CDerr | DCavg | DCerr |
|-------|--------|-------|-------|-------|-------|
| 0.0   | 238.0  | 238.0 | 0.0   | 238.0 | 0.0   |
| 0.1   | 239.7  | 240.1 | 0.2   | 238.0 | -0.7  |
| 0.2   | 241.4  | 241.2 | -0.1  | 238.0 | -1.4  |
| 0.3   | 243.1  | 243.3 | 0.1   | 238.0 | -2.1  |
| 0.4   | 244.8  | 245.4 | 0.3   | 238.0 | -2.8  |
| 0.5   | 246.5  | 246.5 | 0.0   | 255.0 | 3.4   |
| 0.6   | 248.2  | 247.6 | -0.3  | 255.0 | 2.7   |
| 0.7   | 249.9  | 249.7 | -0.1  | 255.0 | 2.0   |
| 0.8   | 251.6  | 251.8 | 0.1   | 255.0 | 1.4   |
| 0.9   | 253.3  | 252.9 | -0.2  | 255.0 | 0.7   |
| 1.0   | 255.0  | 255.0 | 0.0   | 255.0 | 0.0   |

Fixed:      alpha:       0.5
            8-bit bg:    17

Variable:   8-bit fg:    (17,34), increment= 1 cat t6.err | tekplot -w .2 -h .2 -x 16 34 2 -y 0 35 5

| FG | Cfloat | CDavg | CDerr | DCavg | DCerr |
|----|--------|-------|-------|-------|-------|
| 17 | 17.0 | 17.0 | 0.0 | 17.0 | 0.0 |
| 18 | 17.5 | 18.1 | 3.2 | 17.8 | 3.2 |
| 19 | 18.0 | 18.1 | 0.3 | 19.1 | 6.3 |
| 20 | 18.5 | 19.1 | 3.4 | 20.2 | 9.1 |
| 21 | 19.0 | 19.1 | 0.7 | 21.3 | 11.8 |
| 22 | 19.5 | 20.2 | 3.5 | 22.3 | 14.4 |
| 23 | 20.0 | 20.2 | 0.9 | 23.4 | 16.9 |
| 24 | 20.5 | 21.3 | 3.7 | 24.4 | 19.2 |
| 25 | 21.0 | 21.3 | 1.2 | 25.5 | 21.4 |
| 26 | 21.5 | 22.3 | 3.8 | 25.5 | 18.6 |
| 27 | 22.0 | 22.3 | 1.4 | 26.6 | 20.7 |
| 28 | 22.5 | 23.4 | 3.9 | 27.6 | 22.8 |
| 29 | 23.0 | 23.4 | 1.6 | 28.7 | 24.7 |
| 30 | 23.5 | 24.5 | 4.0 | 29.8 | 26.6 |
| 31 | 24.0 | 24.4 | 1.8 | 30.8 | 28.4 |
| 32 | 24.5 | 25.5 | 4.1 | 31.9 | 30.1 |
| 33 | 25.0 | 25.5 | 2.0 | 32.9 | 31.8 |
| 34 | 25.5 | 25.5 | 0.0 | 34.0 | 33.3 |

Fixed:        alpha:        0.5
              8-bit bg:     238

Variable:     8-bit fg:     (238,255), increment= 1 cat t5.err | tekplot -w .2 -h .2 -x 238 256 2 -y 0 4 0.5

| FG | Cfloat | CDavg | CDerr | DCavg | DCerr |
|----|--------|-------|-------|-------|-------|
| 17 | 17.0 | 17.0 | 0.0 | 17.0 | 0.0 |
| 18 | 17.5 | 18.1 | 3.2 | 17.8 | 3.2 |
| 19 | 18.0 | 18.1 | 0.3 | 19.1 | 6.3 |
| 20 | 18.5 | 19.1 | 3.4 | 20.2 | 9.1 |
| 21 | 19.0 | 19.1 | 0.7 | 21.3 | 11.8 |
| 22 | 19.5 | 20.2 | 3.5 | 22.3 | 14.4 |
| 23 | 20.0 | 20.2 | 0.9 | 23.4 | 16.9 |
| 24 | 20.5 | 21.3 | 3.7 | 24.4 | 19.2 |
| 25 | 21.0 | 21.3 | 1.2 | 25.5 | 21.4 |
| 26 | 21.5 | 22.3 | 3.8 | 25.5 | 18.6 |
| 27 | 22.0 | 22.3 | 1.4 | 26.6 | 20.7 |
| 28 | 22.5 | 23.4 | 3.9 | 27.6 | 22.8 |
| 29 | 23.0 | 23.4 | 1.6 | 28.7 | 24.7 |
| 30 | 23.5 | 24.5 | 4.0 | 29.8 | 26.6 |
| 31 | 24.0 | 24.4 | 1.8 | 30.8 | 28.4 |
| 32 | 24.5 | 25.5 | 4.1 | 31.9 | 30.1 |
| 33 | 25.0 | 25.5 | 2.0 | 32.9 | 31.8 |
| 34 | 25.5 | 25.5 | 0.0 | 34.0 | 33.3 |

| X | Y | G_8bit | | X | Y | G_8bit | |
|---|---|---|---|---|---|---|---|
| | | Base 10 | Base 16 | | | Base 10 | Base 16 |
| 5 | 25 | 0 | | 15 | 20 | 128 | |
| 6 | 24 | 13 | | 16 | 19 | 140 | |
| 7 | 24 | 26 | | 17 | 19 | 153 | |
| 8 | 23 | 38 | | 18 | 18 | 166 | |
| 9 | 23 | 51 | | 19 | 18 | 179 | |
| 10 | 22 | 64 | | 20 | 17 | 191 | |
| 11 | 22 | 77 | | 21 | 17 | 204 | |
| 12 | 21 | 89 | | 22 | 16 | 217 | |
| 13 | 21 | 102 | | 23 | 16 | 230 | |
| 14 | 20 | 115 | | 24 | 15 | 242 | |
| | | | | 25 | 15 | 255 | |

Aliased vector, full 8-bit intensity (no dithering).

Aliased vector, full 8-bit intensity (no dithering).

| X | Y | Gdisplay | | X | Y | Gdisplay | |
|---|---|---|---|---|---|---|---|
| | | Base 10 | Base 16 | | | Base 10 | Base 16 |
| 4 | 27 | 0 | | 15 | 19 | 16 | |
| 4 | 26 | 0 | | 16 | 20 | 55 | |
| 4 | 25 | 0 | | 16 | 19 | 55 | |
| 5 | 26 | 0 | | 16 | 18 | 1 | |
| 5 | 25 | 0 | | 17 | 20 | 20 | |
| 5 | 24 | 0 | | 17 | 19 | 84 | |
| 6 | 25 | 5 | | 17 | 18 | 20 | |
| 6 | 24 | 5 | | 18 | 19 | 66 | |
| 6 | 23 | 0 | | 18 | 18 | 66 | |
| 7 | 25 | 3 | | 18 | 17 | 1 | |
| 7 | 24 | 14 | | 19 | 19 | 23 | |
| 7 | 23 | 3 | | 19 | 18 | 98 | |
| 8 | 24 | 15 | | 19 | 17 | 23 | |
| 8 | 23 | 15 | | 20 | 18 | 75 | |
| 8 | 22 | 0 | | 20 | 17 | 75 | |
| 9 | 24 | 7 | | 20 | 16 | 1 | |
| 9 | 23 | 28 | | 21 | 18 | 26 | |
| 9 | 22 | 7 | | 21 | 17 | 112 | |
| 10 | 23 | 25 | | 21 | 16 | 26 | |
| 10 | 22 | 25 | | 22 | 17 | 86 | |
| 10 | 21 | 0 | | 22 | 16 | 86 | |
| 11 | 23 | 10 | | 22 | 15 | 2 | |
| 11 | 22 | 42 | | 23 | 17 | 30 | |
| 11 | 21 | 10 | | 23 | 16 | 127 | |
| 12 | 22 | 35 | | 23 | 15 | 30 | |
| 12 | 21 | 35 | | 24 | 16 | 96 | |
| 12 | 20 | 1 | | 24 | 15 | 96 | |
| 13 | 22 | 13 | | 24 | 14 | 2 | |
| 13 | 21 | 56 | | 25 | 16 | 16 | |
| 13 | 20 | 13 | | 25 | 15 | 70 | |
| 14 | 21 | 45 | | 25 | 14 | 16 | |
| 14 | 20 | 45 | | 26 | 15 | 0 | |
| 14 | 19 | 1 | | 26 | 14 | 0 | |
| 15 | 21 | 16 | | 26 | 13 | 0 | |
| 15 | 20 | 70 | | | | | |

Antialiased vector, full 8-bit intensity (no dithering).

Figure 8c

Antialiased vector, full 8-bit intensity (no dithering).

Linear dithered background for antialiased vector (Example #1)

| 1 | 15 | 2 | 12 |
|---|----|---|----|
| 9 | 5 | 10 | 6 |
| 3 | 13 | 0 | 14 |
| 11 | 7 | 8 | 4 | middle range matrix
(contains values 0-15)

Figure 9b

| 15 | 11 | 13 | 1 | 5 | 9 | 3 | 0 | 14 | 10 | 12 | 2 | 6 | 8 | 4 | 7 |
|----|----|----|---|---|---|---|---|----|----|----|---|---|---|---|---|
| 0 | 8 | 4 | 10 | 2 | 12 | 6 | 14 | 1 | 9 | 5 | 11 | 3 | 13 | 7 | 15 |
| 7 | 3 | 5 | 11 | 15 | 1 | 13 | 9 | 8 | 4 | 6 | 10 | 14 | 2 | 12 | 0 |

Figure 9c

| X | Y | INDEX | | D(INDEX) | Gin | BASEin | BASEout | Gout | Gdisplay | |
|---|---|---|---|---|---|---|---|---|---|---|
| | | X | Y | | | | | | Base 10 | Base 16 |
| 4 | 27 | 0 | 0 | 15 | 34 | 34 | 2 | 2 | 34 | 22 |
| 4 | 26 | 0 | 1 | 0 | 51 | 51 | 3 | 3 | 51 | 33 |
| 4 | 25 | 0 | 2 | 7 | 34 | 34 | 2 | 2 | 34 | 22 |
| 5 | 26 | 1 | 0 | 11 | 32 | 17 | 1 | 2 | 34 | 22 |
| 5 | 25 | 1 | 1 | 8 | 37 | 34 | 2 | 2 | 34 | 22 |
| 5 | 24 | 1 | 2 | 3 | 32 | 17 | 1 | 2 | 34 | 22 |
| 6 | 25 | 2 | 0 | 13 | 26 | 17 | 1 | 1 | 17 | 11 |
| 6 | 24 | 2 | 1 | 4 | 36 | 34 | 2 | 2 | 34 | 22 |
| 6 | 23 | 2 | 2 | 5 | 34 | 34 | 2 | 2 | 34 | 22 |
| 7 | 25 | 3 | 0 | 1 | 33 | 17 | 1 | 2 | 34 | 22 |
| 7 | 24 | 3 | 1 | 10 | 30 | 17 | 1 | 2 | 34 | 22 |
| 7 | 23 | 3 | 2 | 11 | 48 | 34 | 2 | 3 | 51 | 33 |
| 8 | 24 | 4 | 0 | 5 | 46 | 34 | 2 | 3 | 51 | 33 |
| 8 | 23 | 4 | 1 | 2 | 36 | 34 | 2 | 2 | 34 | 22 |
| 8 | 22 | 4 | 2 | 15 | 51 | 51 | 3 | 3 | 51 | 33 |
| 9 | 24 | 5 | 0 | 9 | 36 | 34 | 2 | 2 | 34 | 22 |
| 9 | 23 | 5 | 1 | 12 | 43 | 34 | 2 | 2 | 34 | 22 |
| 9 | 22 | 5 | 2 | 1 | 36 | 34 | 2 | 3 | 51 | 33 |
| 10 | 23 | 6 | 0 | 3 | 46 | 34 | 2 | 3 | 51 | 33 |
| 10 | 22 | 6 | 1 | 6 | 56 | 51 | 3 | 3 | 51 | 33 |
| 10 | 21 | 6 | 2 | 13 | 34 | 34 | 2 | 2 | 34 | 22 |
| 11 | 23 | 7 | 0 | 0 | 54 | 51 | 3 | 4 | 68 | 44 |
| 11 | 22 | 7 | 1 | 14 | 58 | 51 | 3 | 3 | 51 | 33 |
| 11 | 21 | 7 | 2 | 9 | 40 | 34 | 2 | 2 | 34 | 22 |
| 12 | 22 | 8 | 0 | 14 | 66 | 51 | 3 | 3 | 51 | 33 |
| 12 | 21 | 8 | 1 | 1 | 56 | 51 | 3 | 4 | 68 | 44 |
| 12 | 20 | 8 | 2 | 8 | 51 | 51 | 3 | 3 | 51 | 33 |
| 13 | 22 | 9 | 0 | 10 | 43 | 34 | 2 | 2 | 34 | 22 |
| 13 | 21 | 9 | 1 | 9 | 79 | 68 | 4 | 5 | 85 | 55 |
| 13 | 20 | 9 | 2 | 4 | 43 | 34 | 2 | 3 | 51 | 33 |
| 14 | 21 | 10 | 0 | 12 | 66 | 51 | 3 | 4 | 68 | 44 |
| 14 | 20 | 10 | 1 | 5 | 76 | 68 | 4 | 5 | 85 | 55 |
| 14 | 19 | 10 | 2 | 6 | 35 | 34 | 2 | 2 | 34 | 22 |

Figure 9d

| X | Y | INDEX | | D(INDEX) | Gin | BASEin | BASEout | Gout | Gdisplay | |
|---|---|---|---|---|---|---|---|---|---|---|
| | | X | Y | | | | | | Base 10 | Base 16 |
| 15 | 21 | 11 | 0 | 2 | 46 | 34 | 2 | 3 | 51 | 33 |
| 15 | 20 | 11 | 1 | 11 | 86 | 85 | 5 | 5 | 85 | 55 |
| 15 | 19 | 11 | 2 | 10 | 61 | 51 | 3 | 3 | 51 | 33 |
| 16 | 20 | 12 | 0 | 6 | 86 | 85 | 5 | 5 | 85 | 55 |
| 16 | 19 | 12 | 1 | 3 | 76 | 68 | 4 | 5 | 85 | 55 |
| 16 | 18 | 12 | 2 | 14 | 52 | 51 | 3 | 3 | 51 | 33 |
| 17 | 20 | 13 | 0 | 8 | 49 | 34 | 2 | 3 | 51 | 33 |
| 17 | 19 | 13 | 1 | 13 | 99 | 85 | 5 | 5 | 85 | 55 |
| 17 | 18 | 13 | 2 | 2 | 49 | 34 | 2 | 3 | 51 | 33 |
| 18 | 19 | 14 | 0 | 4 | 86 | 85 | 5 | 5 | 85 | 55 |
| 18 | 18 | 14 | 1 | 7 | 96 | 85 | 5 | 6 | 102 | 66 |
| 18 | 17 | 14 | 2 | 12 | 35 | 34 | 2 | 2 | 34 | 22 |
| 19 | 19 | 15 | 0 | 7 | 67 | 51 | 3 | 4 | 68 | 44 |
| 19 | 18 | 15 | 1 | 15 | 114 | 102 | 6 | 6 | 102 | 66 |
| 19 | 17 | 15 | 2 | 0 | 53 | 51 | 3 | 4 | 68 | 44 |
| 20 | 18 | 0 | 0 | 15 | 106 | 102 | 6 | 6 | 102 | 66 |
| 20 | 17 | 0 | 1 | 0 | 96 | 85 | 5 | 6 | 102 | 66 |
| 20 | 16 | 0 | 2 | 7 | 52 | 51 | 3 | 3 | 51 | 33 |
| 21 | 18 | 1 | 0 | 11 | 56 | 51 | 3 | 3 | 51 | 33 |
| 21 | 17 | 1 | 1 | 8 | 135 | 119 | 7 | 8 | 136 | 88 |
| 21 | 16 | 1 | 2 | 3 | 56 | 51 | 3 | 4 | 68 | 44 |
| 22 | 17 | 2 | 0 | 13 | 106 | 102 | 6 | 6 | 102 | 66 |
| 22 | 16 | 2 | 1 | 4 | 117 | 102 | 6 | 7 | 119 | 77 |
| 22 | 15 | 2 | 2 | 5 | 35 | 34 | 2 | 2 | 34 | 22 |
| 23 | 17 | 3 | 0 | 1 | 59 | 51 | 3 | 4 | 68 | 44 |
| 23 | 16 | 3 | 1 | 10 | 142 | 136 | 8 | 8 | 136 | 88 |
| 23 | 15 | 3 | 2 | 11 | 74 | 68 | 4 | 4 | 68 | 44 |
| 24 | 16 | 4 | 0 | 5 | 126 | 119 | 1 | 8 | 136 | 88 |
| 24 | 15 | 4 | 1 | 2 | 116 | 102 | 6 | 7 | 119 | 77 |
| 24 | 14 | 4 | 2 | 15 | 52 | 51 | 3 | 3 | 51 | 33 |
| 25 | 16 | 5 | 0 | 9 | 48 | 34 | 2 | 3 | 51 | 33 |
| 25 | 15 | 5 | 1 | 12 | 95 | 85 | 5 | 5 | 85 | 55 |
| 25 | 14 | 5 | 2 | 1 | 48 | 34 | 2 | 3 | 51 | 33 |
| 26 | 15 | 6 | 0 | 3 | 34 | 34 | 2 | 2 | 34 | 22 |
| 26 | 14 | 6 | 1 | 6 | 51 | 51 | 3 | 3 | 51 | 33 |
| 26 | 13 | 6 | 2 | 13 | 34 | 34 | 2 | 2 | 34 | 22 |

Figure 9e

Linear dithered background for antialiased vector (Example #1)

Antialiased vector, nonlinear quantization, 3x16 dither matrix (Example #2)

Figure 10a low range matrix
(contains values 0-7)

Figure 10b middle range matrix
(contains values 0-15)

Figure 10c high range matrix
(contains values 0-30)

Figure 10d

| 7 | 5 | 6 | 4 | 3 | 0 | 2 | 1 | 7 | 5 | 6 | 4 | 3 | 0 | 2 | 1 |
|---|---|---|---|---|---|---|---|---|---|---|---|---|---|---|---|
| 0 | 4 | 2 | 6 | 1 | 5 | 3 | 7 | 0 | 4 | 2 | 6 | 1 | 5 | 3 | 7 |
| 4 | 1 | 3 | 0 | 7 | 5 | 6 | 2 | 4 | 1 | 3 | 0 | 7 | 5 | 6 | 2 |

Figure 10e

| 15 | 11 | 13 | 1 | 5 | 9 | 3 | 0 | 14 | 10 | 12 | 2 | 6 | 8 | 4 | 7 |
|----|----|----|---|---|---|---|---|----|----|----|---|---|---|---|---|
| 0 | 8 | 4 | 10 | 2 | 12 | 6 | 14 | 1 | 9 | 5 | 11 | 3 | 13 | 7 | 15 |
| 7 | 3 | 5 | 11 | 15 | 1 | 13 | 9 | 8 | 4 | 6 | 10 | 14 | 2 | 12 | 0 |

Figure 10f

| 30 | 22 | 26 | 2 | 10 | 18 | 6 | 0 | 28 | 20 | 24 | 4 | 12 | 16 | 8 | 14 |
|----|----|----|---|----|----|---|---|----|----|----|---|----|----|---|----|
| 0 | 16 | 8 | 20 | 4 | 24 | 12 | 28 | 2 | 18 | 10 | 22 | 6 | 26 | 14 | 30 |
| 14 | 6 | 10 | 22 | 30 | 2 | 26 | 18 | 16 | 8 | 12 | 20 | 28 | 4 | 24 | 0 |

Figure 10g

| X | Y | INDEX X Y | D(INDEX) | Gin | BASEin | BASEout | Gout | Gdisplay Base 10 | Base 16 |
|---|---|---|---|---|---|---|---|---|---|
| 4 | 27 | 0 0 | 7 | 36 | 36 | 4 | 4 | 36 | 24 |
| 4 | 26 | 0 1 | 0 | 45 | 45 | 5 | 5 | 45 | 2D |
| 4 | 25 | 0 2 | 4 | 36 | 36 | 4 | 4 | 36 | 24 |
| 5 | 26 | 1 0 | 5 | 34 | 27 | 3 | 4 | 36 | 24 |
| 5 | 25 | 1 1 | 4 | 33 | 27 | 3 | 4 | 36 | 24 |
| 5 | 24 | 1 2 | 1 | 34 | 27 | 3 | 4 | 36 | 24 |
| 6 | 25 | 2 0 | 6 | 27 | 27 | 3 | 3 | 27 | 1B |
| 6 | 24 | 2 1 | 2 | 32 | 27 | 3 | 4 | 36 | 24 |
| 6 | 23 | 2 2 | 3 | 36 | 36 | 4 | 4 | 36 | 24 |
| 7 | 25 | 3 0 | 4 | 43 | 36 | 4 | 5 | 45 | 2D |
| 7 | 24 | 3 1 | 6 | 30 | 27 | 3 | 3 | 27 | 1B |
| 7 | 23 | 3 2 | 0 | 43 | 36 | 4 | 5 | 45 | 2D |
| 8 | 24 | 4 0 | 3 | 42 | 36 | 4 | 5 | 45 | 2D |
| 8 | 23 | 4 1 | 1 | 37 | 36 | 4 | 4 | 36 | 24 |
| 8 | 22 | 4 2 | 7 | 45 | 45 | 5 | 5 | 45 | 2D |
| 9 | 24 | 5 0 | 0 | 38 | 36 | 4 | 5 | 45 | 2D |
| 9 | 23 | 5 1 | 5 | 48 | 45 | 5 | 5 | 45 | 2D |
| 9 | 22 | 5 2 | 5 | 38 | 36 | 4 | 4 | 36 | 24 |
| 10 | 23 | 6 0 | 2 | 47 | 45 | 5 | 5 | 45 | 2D |
| 10 | 22 | 6 1 | 3 | 53 | 45 | 5 | 6 | 54 | 36 |
| 10 | 21 | 6 2 | 6 | 36 | 36 | 4 | 4 | 36 | 24 |
| 11 | 23 | 7 0 | 1 | 49 | 45 | 5 | 6 | 54 | 36 |
| 11 | 22 | 7 1 | 14 | 59 | 54 | 6 | 6 | 54 | 36 |
| 11 | 21 | 7 2 | 2 | 49 | 45 | 5 | 6 | 54 | 36 |
| 12 | 22 | 8 0 | 14 | 62 | 54 | 6 | 6 | 54 | 36 |
| 12 | 21 | 8 1 | 1 | 57 | 54 | 6 | 7 | 71 | 47 |
| 12 | 20 | 8 2 | 4 | 45 | 45 | 5 | 5 | 45 | 2D |
| 13 | 22 | 9 0 | 5 | 45 | 45 | 5 | 5 | 45 | 2D |
| 13 | 21 | 9 1 | 9 | 76 | 71 | 7 | 7 | 71 | 47 |
| 13 | 20 | 9 2 | 1 | 45 | 45 | 5 | 5 | 45 | 2D |
| 14 | 21 | 10 0 | 12 | 67 | 54 | 6 | 6 | 54 | 36 |
| 14 | 20 | 10 1 | 5 | 73 | 71 | 7 | 7 | 71 | 47 |
| 14 | 19 | 10 2 | 3 | 37 | 36 | 4 | 4 | 36 | 24 |

Figure 10h

| X | Y | INDEX | | D(INDEX) | Gin | BASEin | BASEout | Gout | Gdisplay | |
|---|---|---|---|---|---|---|---|---|---|---|
| | | X | Y | | | | | | Base 10 | Base 16 |
| 15 | 21 | 11 | 0 | 2 | 56 | 54 | 6 | 6 | 54 | 36 |
| 15 | 20 | 11 | 1 | 11 | 87 | 71 | 7 | 8 | 88 | 58 |
| 15 | 19 | 11 | 2 | 10 | 56 | 54 | 6 | 6 | 54 | 36 |
| 16 | 20 | 12 | 0 | 6 | 83 | 71 | 7 | 8 | 88 | 58 |
| 16 | 19 | 12 | 1 | 3 | 77 | 71 | 7 | 8 | 88 | 58 |
| 16 | 18 | 12 | 2 | 7 | 46 | 45 | 5 | 5 | 45 | 2D |
| 17 | 20 | 13 | 0 | 0 | 51 | 45 | 5 | 6 | 54 | 36 |
| 17 | 19 | 13 | 1 | 13 | 104 | 88 | 8 | 9 | 105 | 69 |
| 17 | 18 | 13 | 2 | 5 | 51 | 45 | 5 | 5 | 45 | 2D |
| 18 | 19 | 14 | 0 | 4 | 87 | 71 | 7 | 8 | 88 | 58 |
| 18 | 18 | 14 | 1 | 7 | 93 | 88 | 8 | 8 | 88 | 58 |
| 18 | 17 | 14 | 2 | 6 | 37 | 36 | 4 | 4 | 36 | 24 |
| 19 | 19 | 15 | 0 | 7 | 62 | 54 | 6 | 7 | 71 | 47 |
| 19 | 18 | 15 | 1 | 15 | 115 | 105 | 9 | 9 | 105 | 69 |
| 19 | 17 | 15 | 2 | 0 | 62 | 54 | 6 | 7 | 71 | 47 |
| 20 | 18 | 0 | 0 | 15 | 103 | 88 | 8 | 8 | 88 | 58 |
| 20 | 17 | 0 | 1 | 0 | 97 | 88 | 8 | 9 | 105 | 69 |
| 20 | 16 | 0 | 2 | 4 | 46 | 45 | 5 | 5 | 45 | 2D |
| 21 | 18 | 1 | 0 | 11 | 58 | 54 | 6 | 6 | 54 | 36 |
| 21 | 17 | 1 | 1 | 8 | 132 | 122 | 10 | 11 | 139 | 8B |
| 21 | 16 | 1 | 2 | 3 | 58 | 54 | 6 | 7 | 71 | 47 |
| 22 | 17 | 2 | 0 | 13 | 107 | 105 | 9 | 9 | 105 | 69 |
| 22 | 16 | 2 | 1 | 4 | 113 | 105 | 9 | 10 | 122 | 7A |
| 22 | 15 | 2 | 2 | 3 | 37 | 36 | 4 | 4 | 36 | 24 |
| 23 | 17 | 3 | 0 | 1 | 69 | 54 | 6 | 7 | 71 | 47 |
| 23 | 16 | 3 | 1 | 10 | 143 | 139 | 11 | 11 | 139 | 8B |
| 23 | 15 | 3 | 2 | 11 | 69 | 54 | 6 | 7 | 71 | 47 |
| 24 | 16 | 4 | 0 | 5 | 123 | 122 | 10 | 10 | 122 | 7A |
| 24 | 15 | 4 | 1 | 2 | 117 | 105 | 9 | 10 | 122 | 7A |
| 24 | 14 | 4 | 2 | 7 | 46 | 45 | 5 | 5 | 45 | 2D |
| 25 | 16 | 5 | 0 | 0 | 50 | 45 | 5 | 6 | 54 | 36 |
| 25 | 15 | 5 | 1 | 12 | 103 | 88 | 8 | 9 | 105 | 69 |
| 25 | 14 | 5 | 2 | 5 | 50 | 45 | 5 | 5 | 45 | 2D |
| 26 | 15 | 6 | 0 | 2 | 36 | 36 | 4 | 4 | 36 | 24 |
| 26 | 14 | 6 | 1 | 3 | 45 | 45 | 5 | 5 | 45 | 2D |
| 26 | 13 | 6 | 2 | 6 | 36 | 36 | 4 | 4 | 36 | 24 |

Antialiased vector, nonlinear quantization, 3x16 dither matrix (Example #2)

METHOD AND APPARATUS FOR THE DITHERING OF ANTIALIASED VECTORS

BACKGROUND OF THE INVENTION

1. Field of the Invention

The method and apparatus of the present invention relates to the rendering of lines on computer graphic display devices. More specifically, the method and apparatus of the present invention relates to the rendering of high quality lines into a low resolution frame buffer.

2. Related Applications

The present invention is related to U.S. application Ser. No. 07/413,984, filed Sep. 28, 1989 entitled "Method and Apparatus For Vector Aligned Dithering", U.S. application Ser. No. 07/413,911, filed Sep. 28, 1989 entitled "Method and Apparatus For Non-Linear Dithering of Digital Images" and U.S. application Ser. No. 07/413,983, filed Sep. 28, 1989 entitled "Method and Apparatus for Dighering Graphic Images" are herein incorporated by reference.

3. Art Background

A picture or image may be thought of as a continuous representation of the object projected. It is often desirable to represent images on a digital computer display device such as a monitor or a printer. However, a computer and its output devices are binary in nature. A computer display comprises a grid of display elements, referred to as pixels, which can either be in one of a plurality of on states indicative of its intensity, in which the pixel location is illuminated, or in the off state in which the pixel location is not illuminated. In order to display continuous images, the continuous images must be converted to discrete representations corresponding to the pixel locations on the display device. A digital image is quantized in both the spatial domain and the intensity domain.

The amount of memory available (that is, the size of the frame buffer) dictates the quantized levels available to represent the image. If the resolution of either sample space (i.e. spatial and intensity) drops below a threshold (due to memory limitations), the eye will detect the discrete boundaries between samples. In the intensity domain, insufficient resolution is marked by the presence of artificial edges delimiting the transitions between regions of incremental intensity. Other undesirable visible effects, such as patterning, color shifting and biasing, are introduced due to the visible thresholding between quantized intensity levels.

To minimize the undesirable effects, a technique, referred to as dithering or digital halftoning, is used. Dithering is a technique which permits the simulation of intensity levels between quantized levels by permitting the eye to integrate fine detail within an area and record only the overall intensity of the area. Dithering aims to sacrifice some of an image's spatial resolution for an increase in perceived intensity resolution, accomplished by averaging the intensities of several neighboring pixels to simulate intensities that lie between quantization levels. Typically, this technique works well, since the eye naturally blends individual pixel values such that only the average intensity in the surrounding area or neighborhood is perceived. For more information on dithering, see Ulichney, *Digital Halftoning* (1987, MIT Press); Foley & Van Dam, *Fundamentals of Interactive Computer Graphics*, p. 597–602 (Addison-Wesley, 1984).

Several types of dithering techniques exist. The types of dithering algorithms are distinguished by the way the neighborhoods are chosen. In the technique of ordered dither, the neighborhoods are chosen according to a two dimensional set of values, referred to as the dither table or dither matrix, which is tiled into the image's coordinate space. Typically for area dither, the table has the same number of row and column elements and the total number of entries in the table equals the number of simulatable intensity levels between the quantized levels. The values contained in the table are used to make decisions about which quantized intensity value will be output at each position, that is, should the intensity value be quantized to the quantized value above or below the original intensity value. The dither table values are different at each x,y coordinate location such that when a constant input intensity is dithered over some area, the output values will alternate in some pattern between the upper and lower quantized intensity levels.

The ordered dither process is explained in reference to FIG. 1. Process 1.0 determines the appropriate index into the dither matrix based on the x-y coordinates of the current pixel. Conceptually, the idea is to "tile" the dither matrix into the image coordinate space, thereby replicating each entry once every n pixels, where n is the dimension of the dither table. The indices to the matrix, i-j, are determined according to the following equations:

$$i = x \bmod n$$

$$j = y \bmod n$$

If n is a power of two, it is possible to utilize the least significant bits of the x-y screen coordinates for indexing the dither matrix. For example, if the dimension of the dither matrix is 4×4, then the 2 least significant bits of the x-y coordinates will provide the required modulo-4 indexing.

At process 2.0, the dither values are retrieved from the matrix according to i-j dither indices determined. By the nature of the problem, the output intensity scale has fewer entries than the input intensity scale. In order to quantize the input value, there must be a predetermined correspondence between each level on the output scale to a value on the input scale. It is the task of process 3.0 to determine the input-scale base value, which is the input scale value nearest to but not greater than the original input intensity and which directly corresponds to a value in the stored range of intensities.

The next process, 4.0, determines the value in the stored range of quantized intensity levels that corresponds to the input-scale base. This value will be referred to as the "stored range base value".

At process 5.0, the difference between the input intensity value and its input-scale base value is determined. The result, always guaranteed to be greater than or equal to zero, is the delta value passed along to process 6.0. Process 6.0 is the pivotal dither process, comparing the delta value to the dither value and outputting either the stored range base value or the next higher value. Specifically, if the delta value is less than or equal to the dither value, the stored range base value is output; if delta is greater than the dither value, then the stored range base plus one is output. The output from process 6.0 is the quantized pixel value that is deposited into the pixel store (e.g. a frame buffer).

Although quantized values are stored, these values are typically mapped back to an intensity scale with a greater intensity range for display viewing. That is the task of process 7.0, which is usually implemented by lookup-tables lying between the frame buffer output and the video display input. (This is not part of dithering per se, but is utilized for reconstruction of the dithered image for viewing.)

By performing processses 1.0 through 6.0 on successive input values, dithering causes values both greater than and less than the input intensity to ultimately be displayed, producing regions over which the overall average intensity is approximately equal to the original input intensity.

Because the dithering process exchanges spatial resolution for a perceived increase in bit (i.e., intensity/color) resolution, it is assumed that the object to be dithered has sufficient area to permit the resolution exchange to be accomplished. However, when dithering a line of single pixel width, very little surface area exists and as a consequence, the quality of dithered lines are reduced. Artifacts, such as disappearing line segments when the line color is close to the background color and line raggedness ("jaggies") manifest themselves in the digital image during dithering. This is illustrated in FIG. 2 which depicts a series of radial lines originating from a common central point dithered using area dither techniques. A decrease in the bit resolution (that represents the intensity values) also decreases the number of intensities available, making the image appear more ragged along its edges. In low resolution devices, these artifacts become more prevalent because the number of pixels available in any area of the digital image is small compared to the size of the image and therefore there are fewer pixels that may be used to minimize the visual effects of the artifacts by varying the intensities of the pixels.

To remove the jaggies which arise due to the under sampling of a line, anti-aliasing techniques are used. The visual effects of jaggies are decreased by smoothing the edges of the lines into the background colors by increasing the width of the line and using intermediate colors between the actual line color and the background color on the added line edge pixels. For further information on anti-aliasing, see Gupta, Sproull, "Filtering Edges for Gray Scale Displays", *Computer Graphics*, Vol. 15, No. 3, August, 1981.

Compositing is a technique in which a complex graphic image to be rendered can be broken down into a plurality of "sub-images" or elements which are separately rendered and subsequently blended together. However, "hot spots" often arise after anti-aliasing techniques are performed on intersecting or overlapping lines which are composited together into a single image. This is due to the addition of intensity values at the area of intersections and the nature of anti-aliased lines which typically dictates that the center of the line has a greater intensity than the edges of the lines (which are at a lower intensity in order to blend into the background color).

SUMMARY OF THE INVENTION

It is therefore an object of the present invention to provide a method and apparatus for the rendering of high quality vectors in low resolution devices which employ dithering.

It is therefore an object of the present invention to provide a method and apparatus to render high quality vectors on low resolution frame buffers or output display devices.

In the method and apparatus of the present invention, vectors can be rendered and stored in low resolution frame buffers or digital display devices with the minimum of distortion. The vector to be rendered is first anti-aliased at a first resolution (for example, 8 bits/color component) to minimize jaggies and then is composited with the corresponding background pixels of the digital image stored in the frame buffer. Once the vector is composited with the corresponding pixels of the digital image, the pixel data output from the compositing process is dithered to a second, lower resolution for storage in the frame buffer and for subsequent output to a graphics display device. Prior to compositing, the data from the stored digital image is back-transformed to the first resolution for compositing the digital image at the same, higher resolution as the vector to be incorporated into the digital image.

NOTATION AND NOMENCLATURE

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

BRIEF DESCRIPTION OF THE DRAWINGS

The objects, features and advantages of the method and apparatus of the present invention will be apparent from the following detailed description of the invention in which:

FIGS. 5a, 5b, 5c (1-3) and 5d illustrate the Gupta-Sproull anti-aliasing method employed in the preferred embodiment of the present invention.

FIGS. 6a, 6b and 6c illustrate the dither model and back-transform model employed in the preferred embodiment of the present invention.

FIGS. 8a, 8b, 8c and 8d illustrate the vector and corresponding antialiased vector used in the numerical examples.

FIGS. 9a-9f illustrate a first numerical example utilizing the preferred embodiment of the present invention.

FIGS. 10a-10j illustrate a second numerical example utilizing the preferred embodiment of the present invention.

DETAILED DESCRIPTION OF THE INVENTION

General System Configuration

Figure 1:
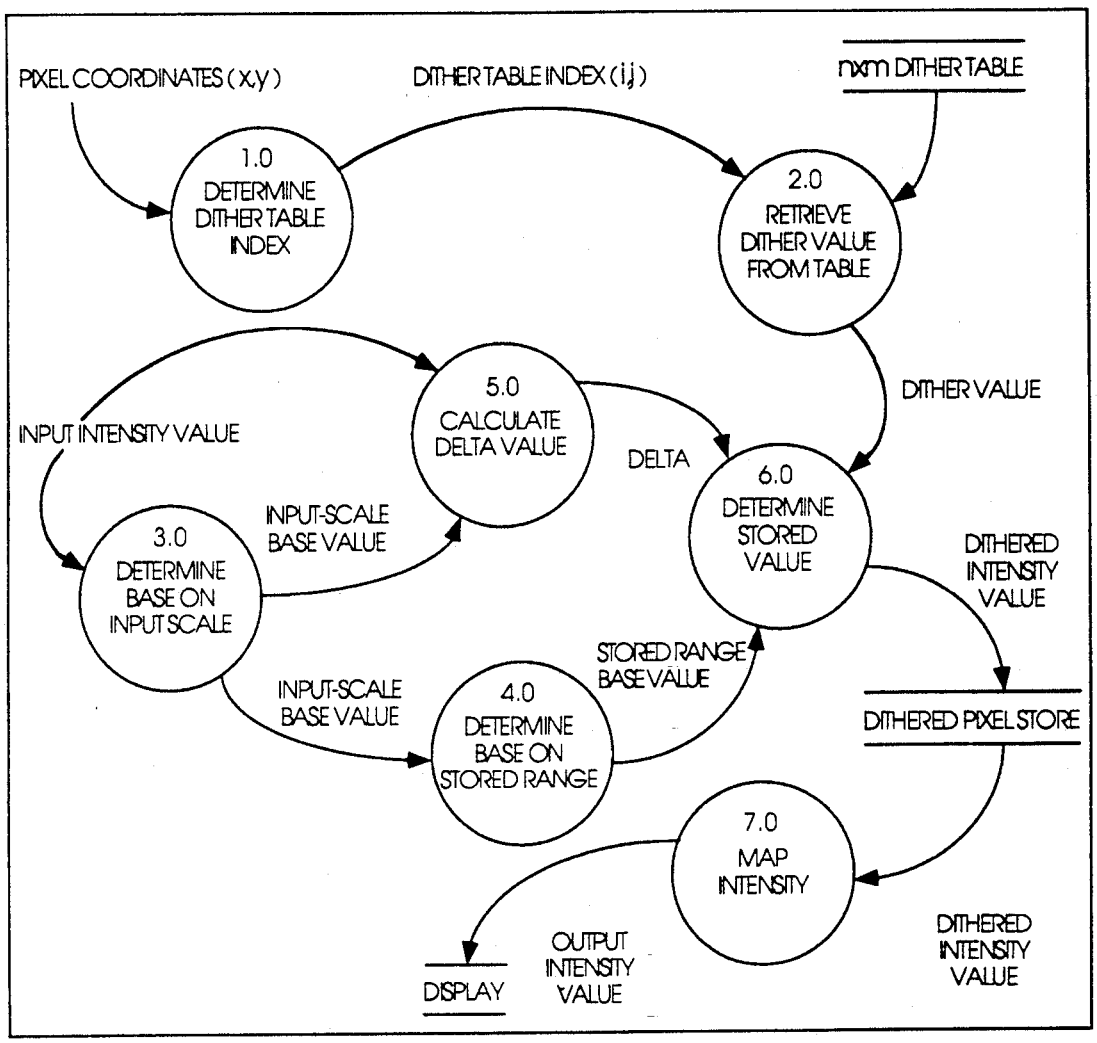
FIG. 1 is a flow diagram illustrative of the prior art ordered dithered process.
Figure 2:
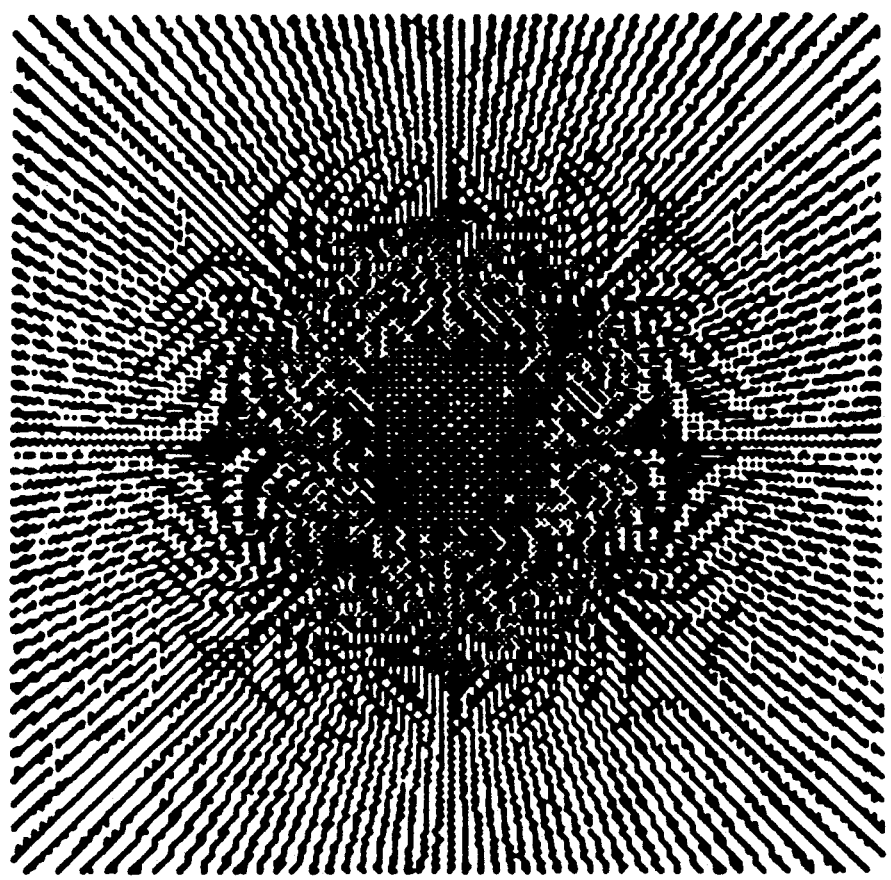
FIG. 2 illustrates the artifacts which occur when area dither is performed on vectors.
Figure 3:
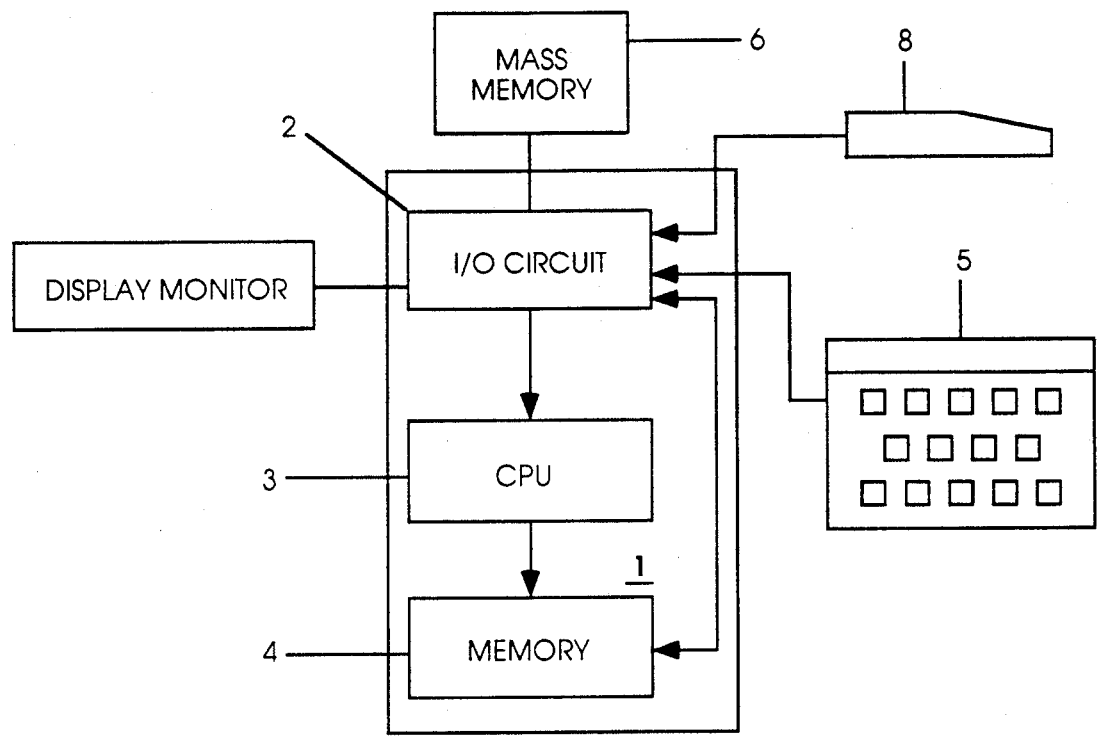
FIG. 3 depicts an illustrative computer system employed in the system of the present invention.

FIG. 3 shows a typical computer-based system for the dithering of digital images according to the present invention. Shown there is a computer 1 which comprises three major components. The first of these is the input/output (I/O) circuit 2 which is used to communicate information in appropriately structured form to and from the other parts of the computer 1. Also shown as a part of computer 1 is the central processing unit (CPU) 3 and memory 4. These latter two elements are those typically found in most general purpose computers and almost all special purpose computers. In fact, the several elements contained within computer 1 are intended to be representative of this broad category of data processors. Particular examples of suitable data processors to fill the role of computer 1 include machines manufactured by Sun Microsystems, Inc., Mountain View, Calif. Other computers having like capabilities may of course be adapted in a straightforward manner to perform the functions described below.

Also shown in FIG. 3 is an input device 5, shown in typical embodiment as a keyboard. It should be understood, however, that the input device may actually be a card reader, magnetic or paper tape reader, or other well-known input device (including, of course, another computer). A mass memory device 6 is coupled to the I/O circuit 2 and provides additional storage capability for the computer 1. The mass memory may include other programs and the like and may take the form of a magnetic or paper tape reader or other well known device. It will be appreciated that the data retained within mass memory 6, may, in appropriate cases, be incorporated in standard fashion into computer 1 as part of memory 4.

In addition, a display monitor 7 is illustrated which is used to display messages or other communications to the user. Such a display monitor may take the form of any of several well-known varieties of CRT displays. Preferably, the display monitor 7 displays the graphic images generated according to the process of the present invention. A cursor control 8 is used to select command modes and provides a more convenient means to input information into the system.

Process Description

Figure 4:
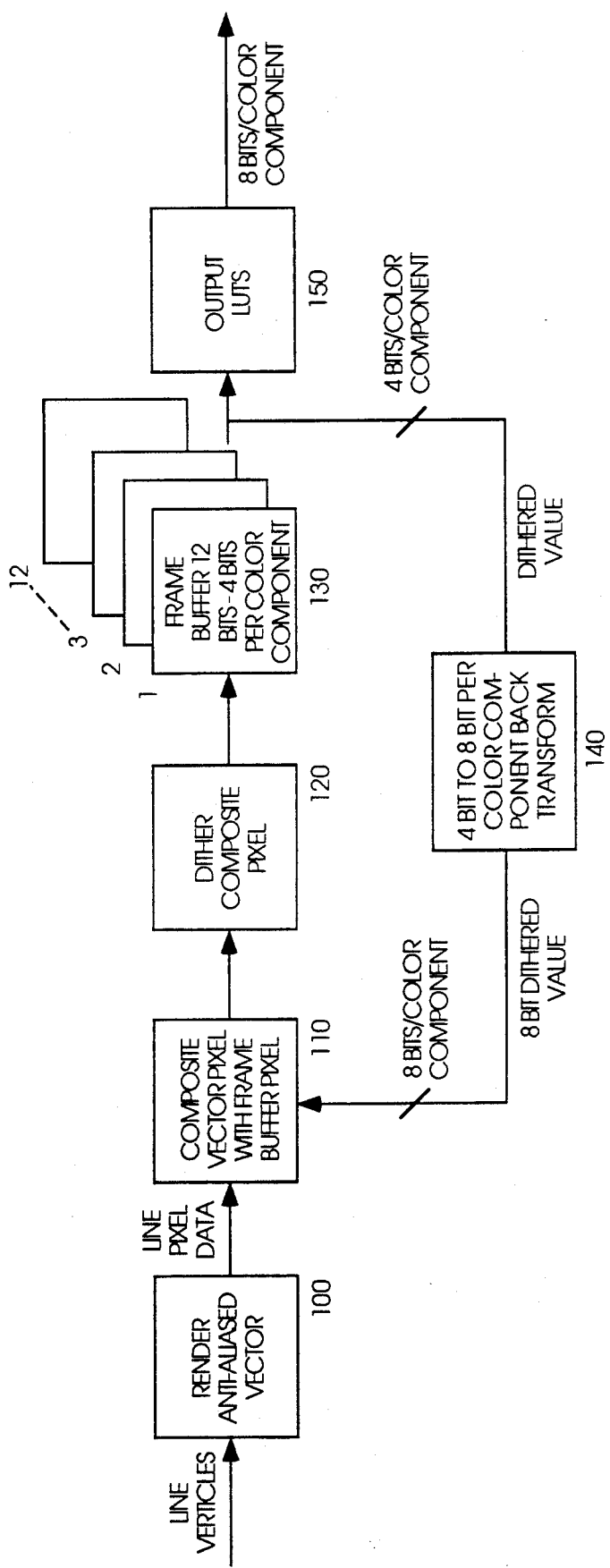
FIG. 4 is a block diagram of a preferred embodiment of the system of the present invention.

A preferred embodiment of the present invention is illustrated by the block diagram of FIG. 4. In the following example used to described a preferred embodiment of the present invention, a 4 bit/color component per pixel frame buffer is used. It will be apparent from the following description that the present invention is not limited to specific frame buffer resolution. In addition, the present invention is equally applicable to greyscale frame buffers and color frame buffers.

Although the quality of a digital image improves when higher resolution frame buffers (e.g., 8 or 12 bits/color component) are used, the dramatic increase in cost for the additional memory is generally prohibitive. Therefore in order to keep memory costs within acceptable limits, the digital image is initially rendered at a higher resolution (in the present example, 8 bits/color component) and dithered to a lower resolution (e.g., 4 bits/color component).

Figure 5A:
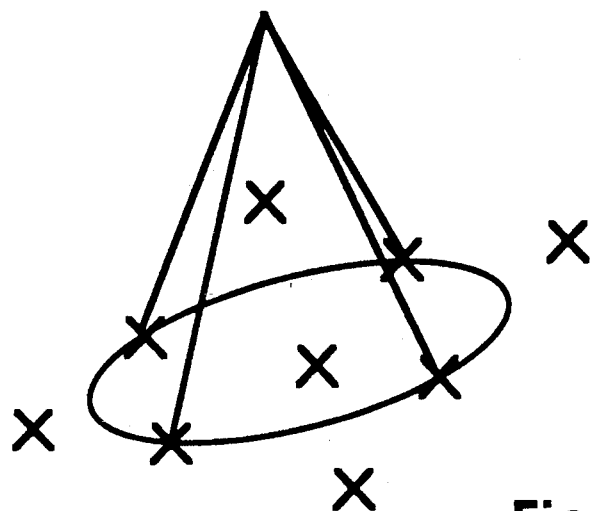
Figure 5B:
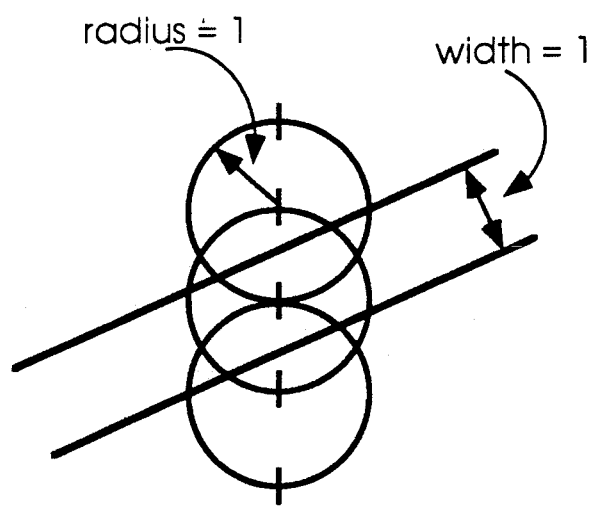

Referring to FIG. 4, At block 100, the vector data to be displayed is modified to produce the pixel image of the corresponding anti-aliased vector. The anti-aliased vector is rendered with an 8 bit/color component intensity resolution. Although there is no limitation as to the anti-aliasing technique to be employed, it is preferred that Gupta-Sproull method is used. In this method, a pixel is viewed as the center of a conic filter of both unit radius and height and therefore of unit volume (See FIG. 5a). When a unit wide line is drawn within a perpendicular distance of 1 pixel from its edge to any pixel center (or 1.5 pixels from the pixel center to the line center), it carves out a volume from the conic filter centered at that pixel. The final intensity of that pixel is then proportional to the volume intersected. FIG. 5b illustrates that for lines of unit thickness in the first octant (i.e., $0 \leq y \leq x$), three pixels in each column are utilized. FIGS. 5c and 5d sets forth illustrative pseudo code which implements the Gupta-Sproull method. Instead of calculating the volume intersection for each pixel, it is preferred that the calculation of the volume intersection is replaced by a look-up table, whereing the table is generated by the pseudo code of FIG. 5c. The index into the table is the perpendicular distance from the center of the pixel to the center of the line. FIG. 5d illustrates the pseudo code for the algorithm. For further information, see Gupta, Sproull, "Filtering Edges for Gray Scale Displays", *Computer Graphics*, Vol. 15, No. 3, August, 1981.

The pixel data representing the anti-aliased vector is, at block 110, composited with the corresponding pixel data contained in the frame buffer. The compositing process may be any known compositing process that blends a foreground color and intensity into the background color and intensity to provide a smoothing effect or transition between the foreground and background. The corresponding pixel data retrieved from the frame buffer are the pixels at the coordinate locations the anti-aliased vector is to be placed in the frame buffer. It is preferred that the compositing process uses an additional component, referred to as the alpha component. The alpha component contains a value determinative of the proportion of the incoming color that is to be blended into the color of pixel retrieved from the frame buffer (See, Carpenter, "The A-Buffer, an Anti-aliased Hidden Surface Method", *Computer Graphics*, Volume 18, No. 3, July 1984). Preferably one of the following compositing equations is utilized:

$$C_{new} = (alpha * C_{in}) + ((1 - alpha) * C_{buff})\quad [1]$$

$$C_{new} = \min(255, (\max(0, (alpha * (C_{in} - C_{bg})) + C_{buff})))\quad [2]$$

where:
$C_{new}$ = resultant color to be placed in the frame buffer
$C_{in}$ = color of incoming vector
$C_{bg}$ = a constant user-specified background color
$C_{buff}$ = color read back from frame buffer
alpha = proportion of incoming color to blend Equation [1] is an alpha blend equation as described in Duff, "Compositing 3-D Rendered Images", *Computer Graphics*, Vol. 19, No. 3, July, 1985. Equation [2] is an additive model which historically originates from stroke vector displays in which the background color of digital image in the frame buffer is considered to be a constant value.

Figures 7A, 7B:
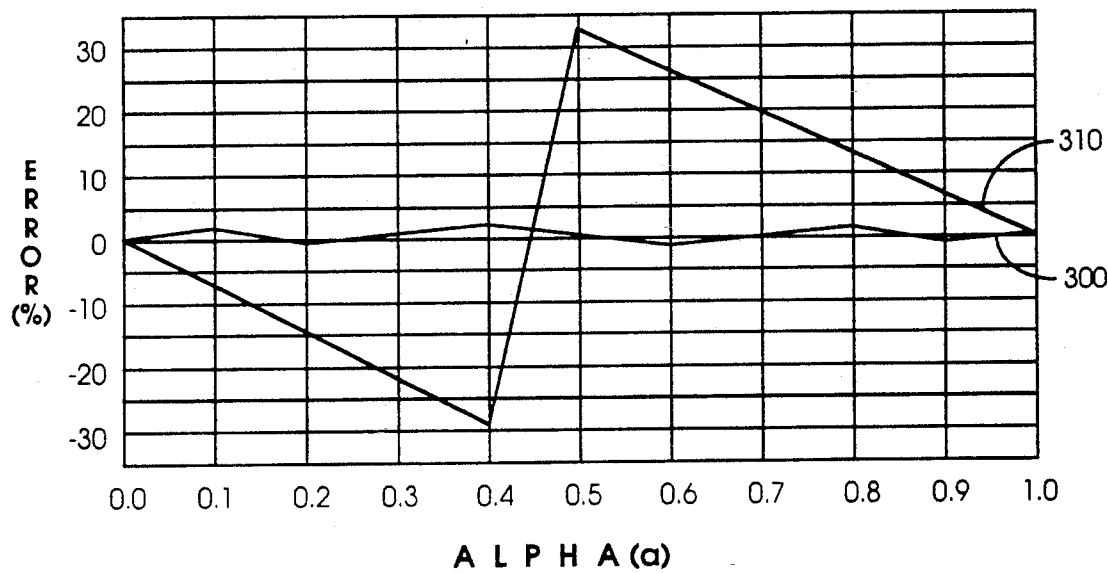
FIGS. 7a-7h set forth an error analysis with respect to the execution order of the steps of compositing and dithering.
Figures 7C, 7D:
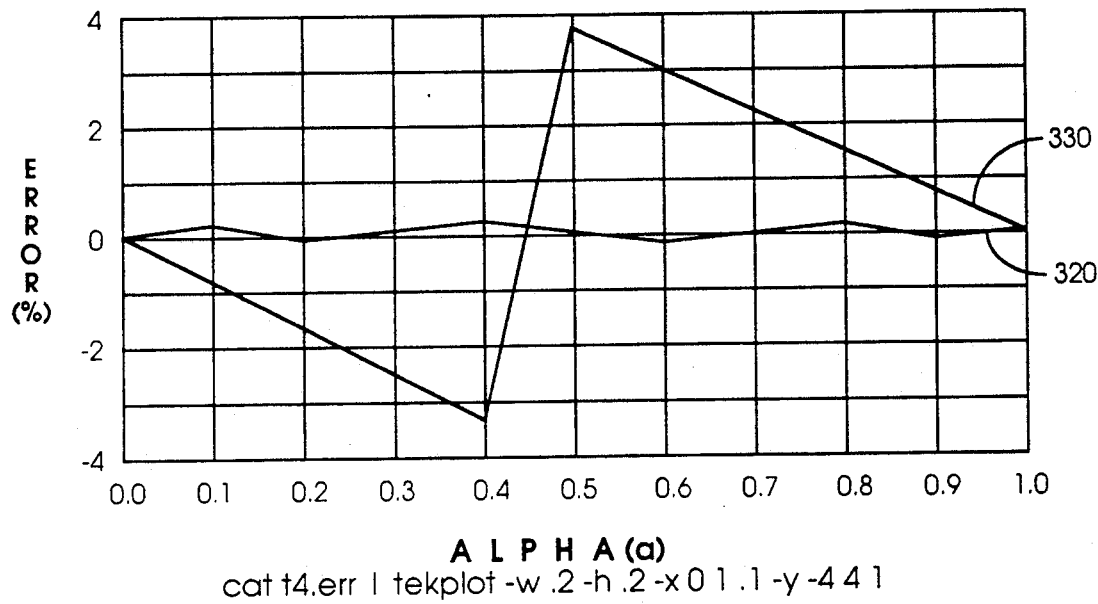
Figures 7E, 7F:
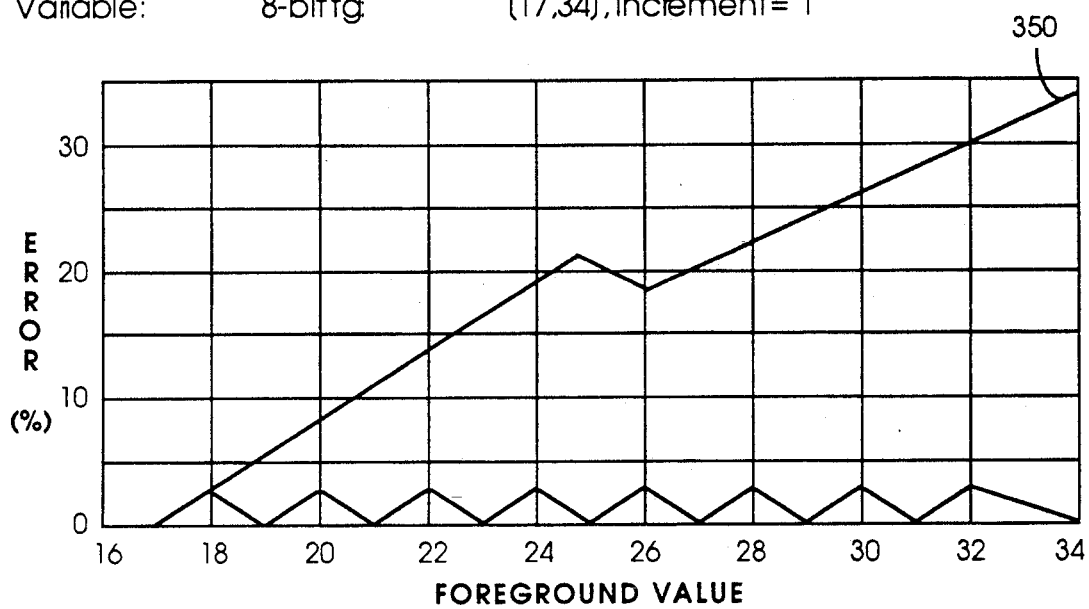
Figures 7G, 7H:
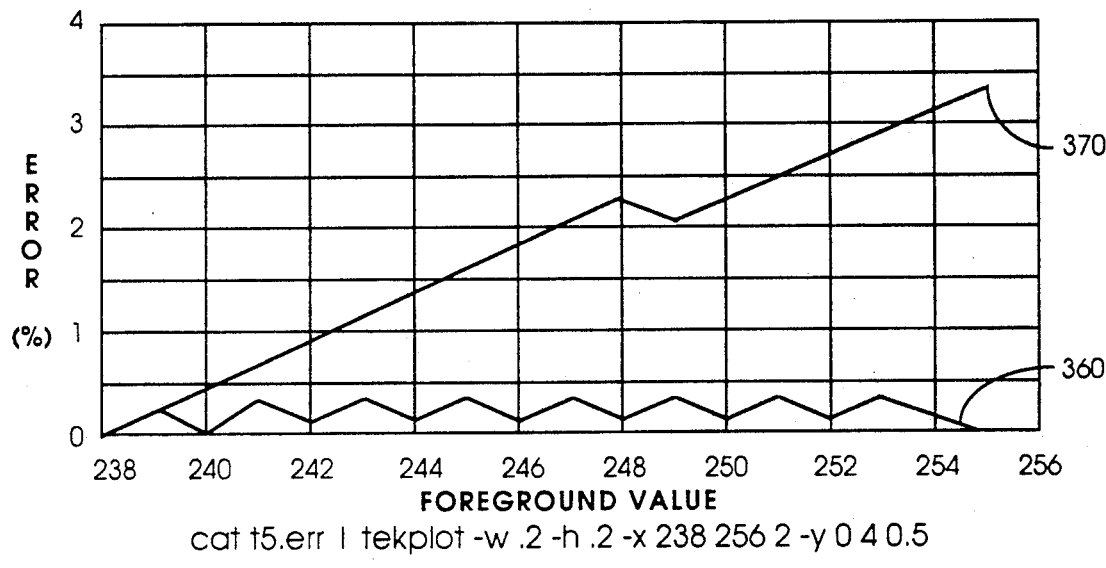

It has been determined the steps of compositing and dithering must be performed in a predetermined sequence in order to render images of the highest possible quality. Specifically, it has been found that compositing should be performed prior to dithering such that the compositing process is executed at the higher resolution. By compositing at the higher resolution, the additional margin of error which occurs when compositing at a lower resolutions is avoided. Because the compositing error is performed in floating point format, a round-off error is introduced when the data is converted back to integer format. The fractional error introduced during round-off is significantly less when the floating point compositing calculation is rounded to the nearest integer in the 8 bit domain than in the 4 bit domain. FIGS. 7a, 7b, 7c and 7d set forth an error analysis performed with respect to the sequence of execution for a linear quantized dither employing an interval of 17. In FIGS. 7a and 7b, the foreground and background values are maintained constant and the alpha value is varied. Specifically, with respect to FIGS. 7a–7b, the foreground color "fg" is fixed at an eight bit value of 34, the background color "bg" is fixed at an eight bit value of 17 and the alpha value is varied from/to [0.0, 1.0] at an increment of 0.1. In FIGS. 7c–7d, the foreground color is fixed at an eight bit value of 255, the background color is fixed at an eight bit value of 238 and the alpha value is varied from/to [0.0, 1.0] at an increment of 0.1. The foreground and background colors in the example set forth in FIG. 7a are low intensity values and the foreground and background colors in the example set forth in FIG. 7b are high intensity values. In FIGS. 7c and 7d, the intensity values of the foreground pixels are varied while the intensity value of the background value and the alpha value are maintained constant. In FIGS. 7e–7f, the foreground color is varied from/to [17,34] at an increment of 1, the background color is fixed at an eight bit value of 17 and the alpha value is fixed at 0.5. With respect to FIGS. 7g–7h, the foreground color is varied from/to [238,255] at an increment of 1, the background color is fixed at an eight bit value of 238 and the alpha value is fixed at 0.5. Referring to FIGS. 7a–7h, "Cfloat" represents the composited result using 8-bit intensities without dither, "CDavg" represents the average pf 16 composite-then-dither results (one result calculated for each dither matrix entry [0,15]), "DCavg" is the average of 16 dither-then-composite results (one result calculated for each dither matrix entry [0,15]), and DCerr and CDerr respectively represent the relative error of CDavg and DCavg, where the relative percentage error for Xavg is:

$$X_{err} = \frac{(X_{avg} - C_{float})}{C_{float}} * 100.$$

As can be seen by examination of the graphs reflecting the % error as a function of the non-constant variable, the order of compositing first and then dithering (identified respectively as 300, 320, 340 and 360) consistently produced resulting values at or about 0% error. These results are significantly better than the results (In FIG. 7a, 7b, 7c and 7d, lines 310, 330, 350 and 370) of % error for the order of dithering prior to compositing.

However, the quality of the digital image would not be maintained during the compositing process if the vector, rendered and anti-aliased at the first higher resolution, was composited with the lower resolution image stored in the frame buffer. Therefore, at block 140, it is necessary that the data read from the frame buffer is back-transformed to the higher resolution representation prior to compositing.

The back-transformation process corresponds to the specific dithering process utilized in order that the dithered values are accurately transformed back to their original values. For example, if a non-linear dithering process was used (as described in copending application Ser. No. 07/413,911, filed, Sep. 28, 1989, entitled "Method and Apparatus for Non-Linear Dithering of Digital Images") to dither the pixel data, the back-transformation process employed is a back-transformation of the non-linear dithering process.

The back-transformation process for the example is illustrated by FIGS. 6a, 6b and 6c. FIG. 6a represents a functional definition of a 8 bit to 4 bit non-linear dither quantization model. The corresponding back-transformation function may simply be a table look-up function wherein the pixel's quantized intensity value is the index to the table. In the present example, the table is generated according to the equations set forth in FIG. 6b. Alternatively, to avoid the need of extra memory that would be required to store the back-transformation table, the back-transformation may be implemented in hardware and the back-transformed value computed when required. For example, the back-transformation may be computed, according to the functions set forth in FIG. 6c, using comparators, adders and shift registers.

At block 120, the composited image is dithered to a 12 bit/color representation for subsequent storage in frame buffer 130. Any dither process may be used, such as the ordered dithered process earlier described. Alternatively, the vector aligned dithering process described in copending U.S. application Ser. No. 07/413,984 filed Sep. 28, 1989 entitled "Method and Apparatus For Vector Aligned Dithering" may be used or the non-linear dithering process described in copending U.S. application Ser. No. 07/413,911 filed Sep. 28, 1989 entitled "Method and Apparatus for Non-Linear Dithering of Digital Images". In addition, the dithering process described in copending U.S. patent application Ser. No. 07/413,983, filed Sep. 28, 1989 entitled "Method and Apparatus for Dithering Graphic Images" can be used.

In the present illustration, the digital image stored in the frame buffer 130 is subsequently output to a display device such as a computer monitor through a lookup table 150 which outputs the corresponding 8 bits/color component pixel data to the circuitry which controls the color intensities on the display device.

The following discussion describes two numerical examples which employ the preferred embodiment of the present invention. In the tables that are referenced, each row corresponds to one rendered pixel for the vector. The rows (and hence pixels) are presented in the order that would be drawn. The tables' column headings are defined as follows:

| | |
|---|---|
| X, Y | The x, y coordinate of the pixel. |
| INDEX | The index (or indices into the dither matrix). |
| D(INDEX) | The dither matrix value at the specified index. |
| $G_{in}$ | The 8-bit grey level (0-255) of the pixel. This is the value input to the dithering process. |
| $BASE_{in}$ | The base value to which $G_{in}$ is compared to determine which quantization range it falls into. |
| $BASE_{out}$ | The corresponding 4-bit value for generating dithered output. Depending upon the dither comparison result, either $BASE_{out}$ or $BASE_{out-1}$ is placed in the frame buffer. |
| $G_{display}$ | The 8-bit grey level (0-255) which actually observed, produced by mapping the 4-bit frame buffer value to 8 bits via an output lookup table. |

In dithering 24-bit RGB data (8 bits/color component) to 12-bit RGB data (4 bits/color component), each color component (R, G and B) is dithered identically but independently. For simplicity, the examples described illustrate the process with respect to only one component (or grey level), but the process is equally applicable to all of the RGB components. Similarly, the following examples illustrate the process with respect to dithering from 8 bits/color component to 4 bits/color component, but it is apparent to one in the art that the invention is not limited to a specific bit resolution or order of dither.

Figures 8A, 8B:
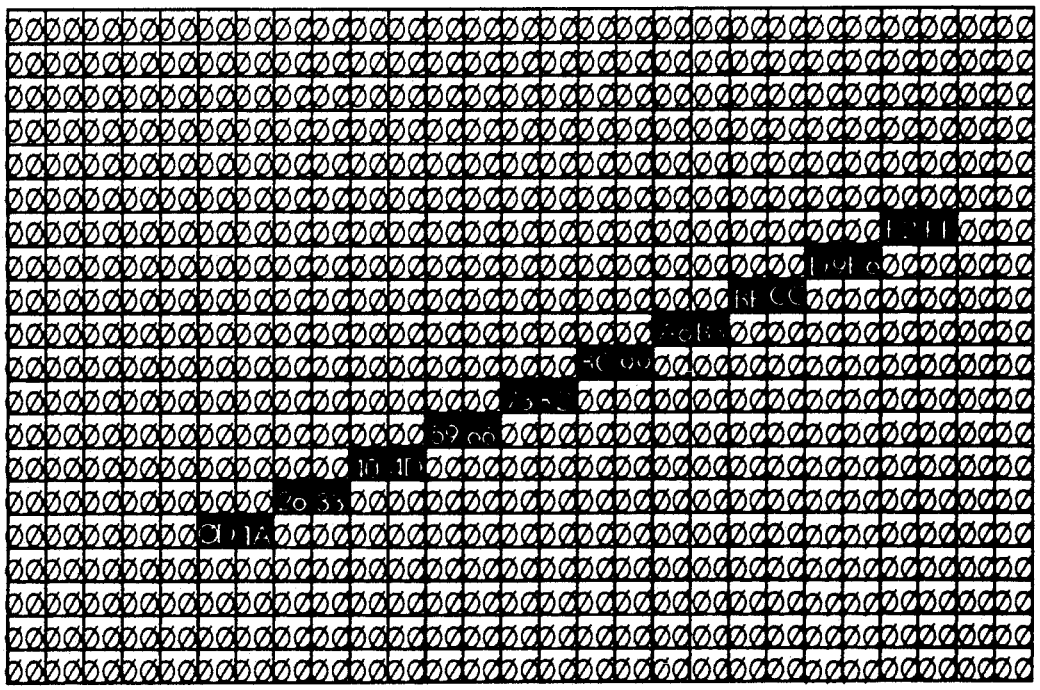

A first numerical example is discussed with respect to FIGS. 8a, 8b, 8c and 8d and FIGS. 9a, 9b, 9c, 9d and 9e. In this example a vector is drawn from (x=5, y=25) to (x=25, y=15). The grey (intensity) level is interpolated along the span of the vector, beginning at 0 and ending at 255. FIG. 8a is a table describing the vector as it would be drawn if a simple Bresenham's line drawing algorithm was utilized and FIG. 8b graphically illustrates the vector (For information on line drawing methods, including Bresenham's algorithm, See: Foley, Van Dam, Fundamentals Of Interactive Computer Graphics, pp 432-436 (Addison, Wesley 1984).

Figures 8D, 9A:
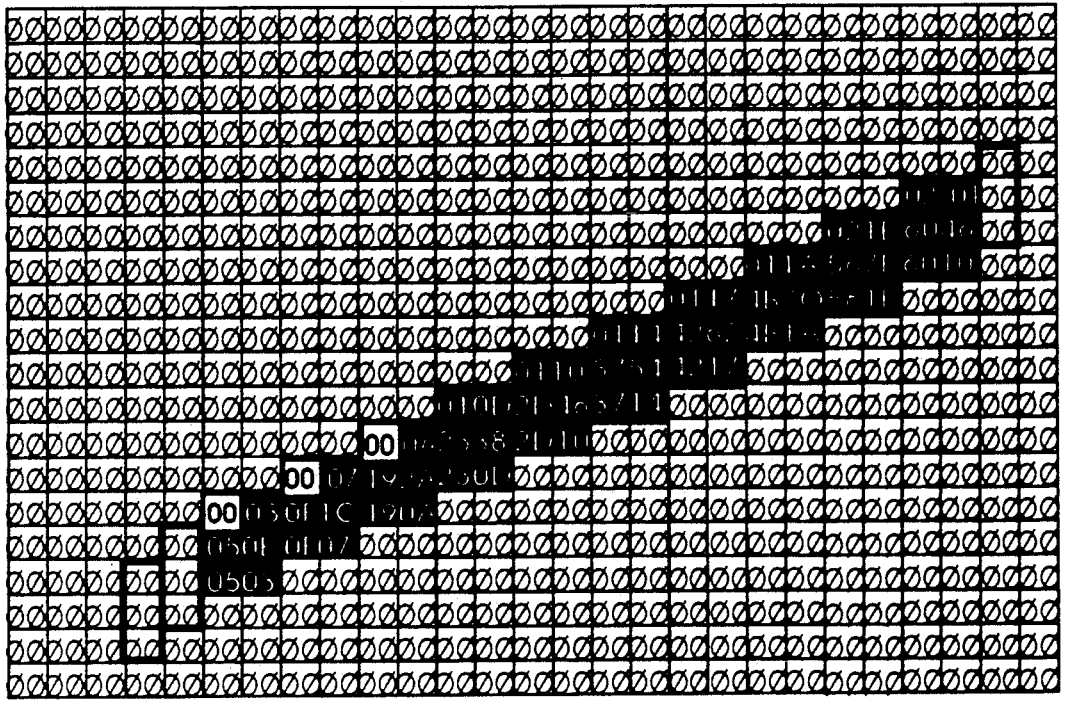

FIGS. 8c and 8d illustrate the same vector anti-aliased using the Gupta-Sproull anti-aliasing technique and, for purposes of illustration, initially composited to a black background.

The initial background intensity is illustrated in FIG. 9a. The background intensity value of 40 is dithered using the screen-aligned linear dither process described in the Art Background section of this Specification in conjunction with the dither matrix illustrated in FIG. 9b to produce a pattern consisting of the values 34 and 51 (22 and 33 hexadecimal).

The anti-aliasing algorithm employs the alpha blend rule for compositing intensities (Equation [1]). Since this example composites with background values which were linearly dithered, the back-transformation equation applied to the background values prior to compositing is: BT=i*17, where BT is the 8-bit back-transformed value and i is the 4-bit quantized value read back from the dithered background.

Figure 9F:
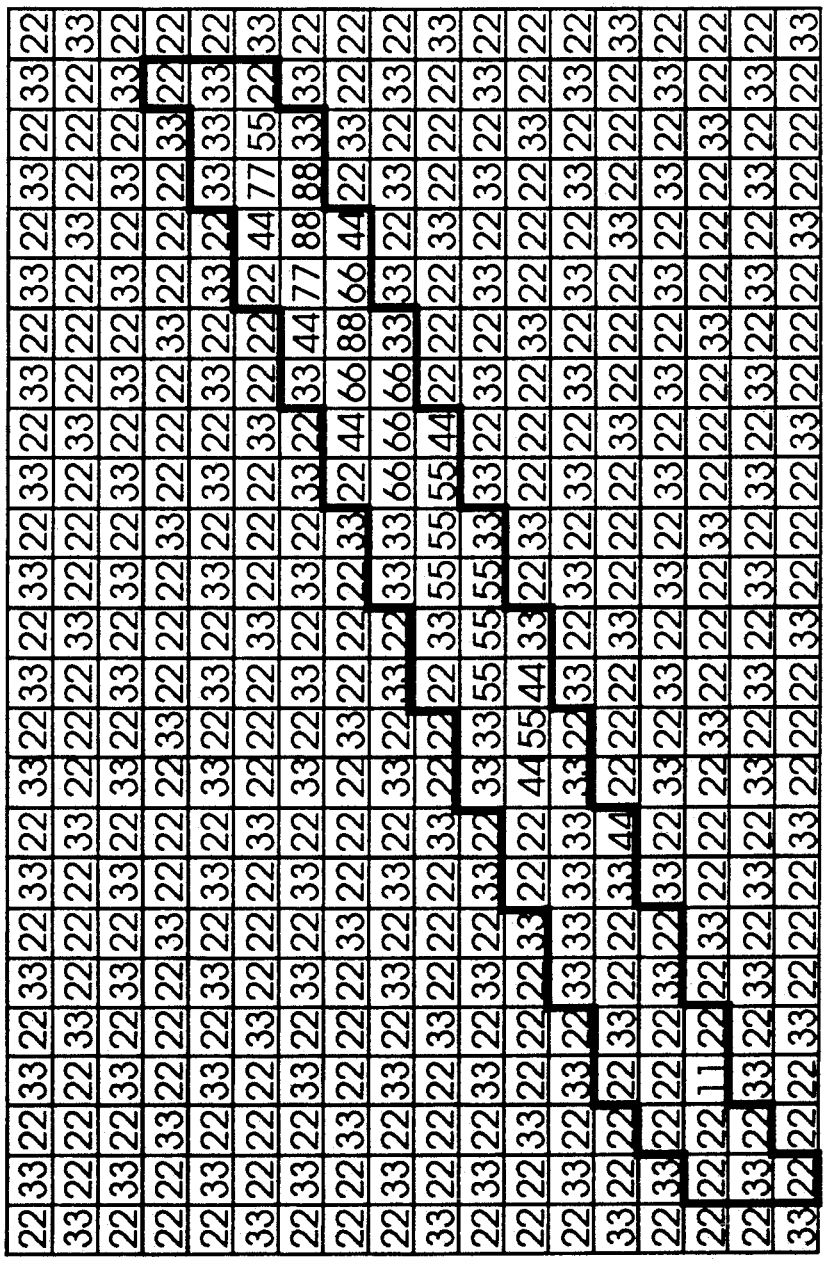

The pixels of the composited vector are then dithered using the vector aligned dithering process (described in copending Patent Application, entitled "Method and Apparatus for Vector Aligned Dithering"). Using the dither matrix illustrated in FIG. 9c, resulting in the values set forth in tables of FIGS. 9d-9e and graphically depicted in FIG. 9f.

A second numerical example is discussed with respect to FIGS. 8a, 8b, 8c and 8d and FIGS. 10a-10j. As with the previous numerical example, a vector is drawn from (x=5, y=25) to (x=25, y=15). The grey (intensity) level is interpolated along the span of the vector, beginning at 0 and ending at 255. FIG. 8a is a table describing the vector as it would be drawn if a simple Bresenham's line drawing algorithm was utilized and FIG. 8b graphically illustrates the vector FIGS. 8c and 8d illustrate the same vector anti-aliased using the Gupta-Sproull anti-aliasing technique and, for purposes of illustration, initially composited to a black background.

The initial background intensity is illustrated in FIG. 10a. In this example, the background intensity value of 40 is dithered using a non-linear screen-aligned dither process (the non-linear dither process is described in co-pending Patent Application entitled "Method and Apparatus for Non Linear Dithering of Digital Images") in conjunction with the dither matrices depicted in FIGS. 10b-10d to produce a pattern consisting of the values 36 and 45 (24 and 2d hexadecimal).

The anti-aliasing algorithm employs the alpha blend rule for compositing intensities (Equation [1]). Since this example composites with background values which were non-linearly dithered, the back-transformation equation applied to the background values prior to compositing is:

$$BT = \begin{cases} i*9 & \text{for } 0 \leq i \leq 7 \\ ((i-6)*17) + 54 & \text{for } 7 \leq i \leq 13 \\ ((i-12)*33) + 156 & \text{for } 13 \leq i \leq 16 \end{cases}$$

where BT is the 8-bit back-transformed value and i is the 4-bit quantized value read back from the dithered background.

The pixels of the composited vector are then dithered using a non-linear vector aligned dithering process (described in copending Patent Application, entitled "Method and Apparatus for Non-Linear Dithering of Digital Images"). using the dither matrices illustrated in FIGS. 10e-10g. Each of the nonlinear dither matrices is applied only to a limited range of intensities. The first dither matrix is used in the range 0-54, the second dither matrix is used for input intensity values in the range of 55-156 and the third dither matrix is used for input intensity values in the range of 157-255. The resulting values are set forth in tables of FIGS. 10h–10i and graphically depicted in FIG. 10j.

While the invention has been described in conjunction with the preferred embodiment, it is evident that numerous alternatives, modifications, variations and uses will be apparent to those skilled in the art in light of the foregoing description.

We claim:

1. A method for rendering a vector represented at a first resolution of intensity on a low resolution device at a second lower resolution of intensity, a store of said low resolution device storing a background pixel image, said vector to be rendered between first and second coordinates in the screen space of the low resolution device, said method comprising the steps of:

anti-aliasing the vector at the first resolution to produce a pixel image of the anti-aliased vector;

compositing the pixel image of the anti-aliased vector with the corresponding pixels of the background image stored in the low resolution device to produce a composited image, said corresponding pixels being those pixels of the background image which form a vector between said first and second coordinates of the screen space, said step of compositing comprising the steps of;

back-transforming the corresponding pixels of the background image from the second resolution to the first resolution;

compositing the pixel image of the anti-aliased vector with the back-transformed pixels of the background image;

dithering the composited image from the first resolution to a second resolution;

storing the dithered image at the second resolution to the store of the low resolution device;

whereby high quality vectors are rendered on the low resolution device.

2. The method of claim 1 wherein the vector is a single pixel in width and is anti-aliased to a vector three pixels in width.

3. The method of claim 1 wherein the store of the low resolution device is a frame buffer and the vector is composited with the background image according to the following equation:

$$C_{new} = (\text{alpha} * C_{in}) + ((1 - \text{alpha}) * C_{buff})$$

where: $C_{new}$ is the resultant color to be placed in the frame buffer, $C_{in}$ is color of the vector to be rendered, $C_{buff}$ is the color read back from frame buffer and alpha is the proportion of the vector color to blend into the background color.

4. The method of claim 1 wherein the store of the low resolution device is a frame buffer and the vector is composited with the background image according to the following equation:

$$C_{new} = \min(255, (\max(0, (\text{alpha} * (C_{in} - C_{bg})) + C_{buff})))$$

where: $C_{new}$ is the resultant color to be placed in the frame buffer, $C_{in}$ is the color of incoming vector, $C_{bg}$ is a constant value user-specified background color, $C_{buff}$ is the color read back from frame buffer and alpha is the proportion of vector color to blend into the background color.

5. The method of claim 1 wherein the composited image is dithered using a vector aligned dithering process.

6. The method of claim 5 wherein the composited image is dithered using a non-linear dithering process.

7. The method of claim 6 wherein the store of the low resolution device is a frame buffer and the first resolution is 8 bits/color component and the second resolution is 4 bits per color component and the composited image is dithered such that:

a low range dither matrix is established for input intensity values between the values of zero and 54 and having output values between zero and 6;

a mid range dither matrix is established for input intensity values between the values of 54 and 156 and having output values between 6 and 12;

a high range dither matrix is established for input intensity values between the values of 156 and 255 and having output values between 12 and 15; and the intensity values of the corresponding pixels of the background image are back-transformed according to the following equation:

$$\text{Back-Transform}(i) = \begin{cases} q(i)*9 & \text{for } 0 \leq q(i) < 7 \\ ((q(i) - 6)*17) + 54 & \text{for } 7 \leq q(i) < 13 \\ ((q(i) - 12)*33) + 156 & \text{for } 13 \leq q(i) < 16 \end{cases}$$

where q(i) is the intensity values of a corresponding pixel stored in the frame buffer.

8. An apparatus for rendering a vector represented at a first resolution of intensity on a low resolution device at a second lower resolution of intensity, a store of said low resolution device storing a background pixel image, said vector to be rendered between first and second coordinates in the screen space of the low resolution device, said apparatus comprising:

means for anti-aliasing the vector at the first resolution to produce a pixel image of the anti-aliased vector;

means for compositing the pixel image of the anti-aliased vector with the corresponding pixels of the background image stored in the low resolution device to produce a composited image, said corresponding pixels being those pixels of the background image which form a vector between said first and second coordinates of the screen space, said means for compositing comprising the steps of;

means for back-transforming the corresponding pixels of the background image from the second resolution to the first resolution;

means for compositing the pixel image of the anti-aliased vector with the back-transformed pixels of the background image;

means for dithering the composited image from the first resolution to a second resolution;

means for storing the dithered image at the second resolution to the store of the low resolution device;

whereby high quality vectors are rendered on the low resolution device.

9. The apparatus of claim 8 wherein the vector is a single pixel in width and is anti-aliased to a vector three pixels in width.

10. The apparatus of claim 8 wherein the store of the low resolution device is a frame buffer and the vector is composited with the background image according to the following equation:

$$C_{new} = (\text{alpha} * C_{in}) + ((1 - \text{alpha}) * C_{buff})$$

where: $C_{new}$ is the resultant color to be placed in the frame buffer, $C_{in}$ is color of the vector to be rendered, $C_{buff}$ is the color read back from frame buffer and alpha is the proportion of the vector color to blend into the background color.

11. The apparatus of claim 8 wherein the store of the low resolution device is a frame buffer and the vector is composited with the background image according to the following equation:

$$C_{new} = \min(255, (\max(0, (\text{alpha} * (C_{in} - C_{bg})) + C_{buff})))$$

where: $C_{new}$ is the resultant color to be placed in the frame buffer, $C_{in}$ is the color of incoming vector, $C_{bg}$ is a constant value user-specified background color, $C_{buff}$ is the color read back from frame buffer and alpha is the proportion of vector color to blend into the background color.

12. The apparatus of claim 8 wherein the composited image is dithered using a vector aligned dithering process.

13. The apparatus of claim 12 wherein the composited image is dithered using a non-linear dithering process.

14. The apparatus of claim 13 wherein the store of the low resolution device is a frame buffer, the first resolution is 8 bits/color component and the second resolution is 4 bits color component and the composited image is dithered such that:

a low range dither matrix is established for input intensity values between the values of zero and 54 and having output values between zero and 6;

a mid range dither matrix is established for input intensity values between the values of 54 and 156 and having output values between 6 and 12;

a high range dither matrix is established for input intensity values between the values of 156 and 255 and having output values between 12 and 15; and the intensity values of corresponding pixels of the background image are back-transformed according to the following equation:

$$\text{Back-Transform}(i) = \begin{cases} q(i)*9 & \text{for } 0 \leq q(i) < 7 \\ ((q(i) - 6)*17) + 54 & \text{for } 7 \leq q(i) < 13 \\ ((q(i) - 12)*33) + 156 & \text{for } 13 \leq q(i) < 16 \end{cases}$$

where q(i) is the intensity values of a corresponding pixel stored in the frame buffer.

* * * * *